No. 730,915. PATENTED JUNE 16, 1903.
G. HOLLIDAY.
MECHANICAL MOVEMENT.
APPLICATION FILED SEPT. 5, 1902.
NO MODEL.

WITNESSES
Edwin F. Samuels.
Farnum F. Dorsey

INVENTOR
Gavin Holliday
by his Attorneys
Phillips Van Everen & Fish

No. 730,915. Patented June 16, 1903.

UNITED STATES PATENT OFFICE.

GAVIN HOLLIDAY, OF SAUGUS, MASSACHUSETTS.

MECHANICAL MOVEMENT.

SPECIFICATION forming part of Letters Patent No. 730,915, dated June 16, 1903.

Application filed September 5, 1902. Serial No. 122,162. (No model.)

*To all whom it may concern:*

Be it known that I, GAVIN HOLLIDAY, a citizen of the United States, residing at Saugus, in the county of Essex and State of Massachusetts, have invented certain new and useful Improvements in Mechanical Movements; and I do hereby declare the following to be a full, clear, and exact description of the invention, such as will enable others skilled in the art to which it appertains to make and use the same.

The present invention relates to an improved mechanical movement.

The object of my invention is to produce a simple and efficient mechanism for rotating two adjacent rotatable elements in opposite directions.

Another object is to make a movement of this kind which can be conveniently held in one hand and operated by the other.

The invention consists in the devices and combinations of devices hereinafter described, and particularly defined in the claims.

Figure 1:
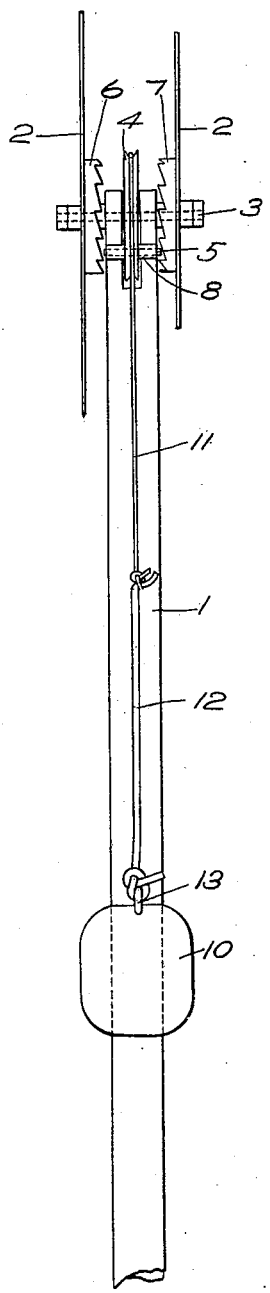
Figure 2:
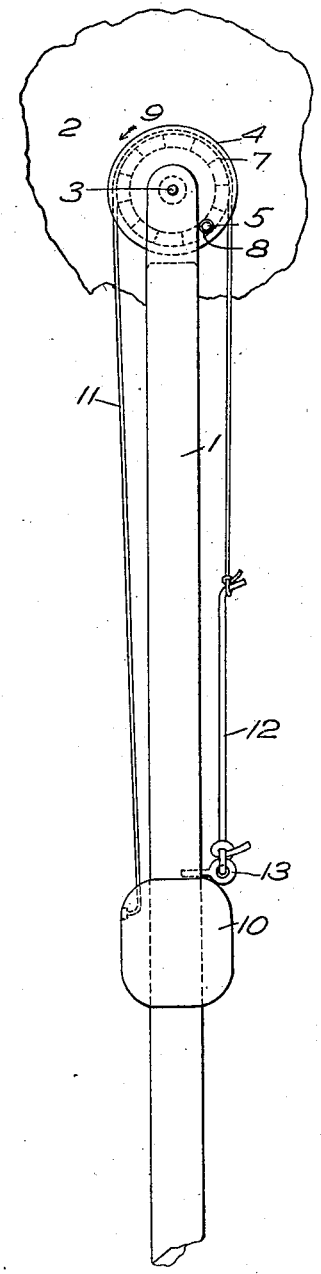

In the accompanying drawings, Figure 1 is a side elevation of the device, and Fig. 2 is a front elevation of the device with one of the rotatable members and its ratchet-wheel removed for the sake of clearness.

In the accompanying drawings the frame, conveniently in the form of a rod 1, supports the rotatable members 2, which are loosely mounted on the shaft or pin 3, rigidly secured to the rod 1. The upper end of the rod 1 is bifurcated or forked, and loosely mounted on the shaft 3 is an oscillatory pulley 4, carrying a pawl 5, adapted to engage either the one or the other of two ratchet-wheels 6 and 7, secured, respectively, to the members 2. The pawl 5 consists of a sliding pin loosely mounted in a bearing 8, secured to or formed integrally with the pulley 4. When the pulley moves in one direction—as, for example, in the direction of the arrow 9—the pawl 5 will be slid, by engagement with the inclined sides of the teeth of the ratchet-wheel 7, to the left as viewed in Fig 1, and its left-hand end will engage and rotate the ratchet-wheel 6. Conversely, when the pulley 4 oscillates in the opposite direction the inclined sides of the teeth of the ratchet-wheel 6 will slide the pawl 5 to the right and cause it to engage and rotate the ratchet-wheel 7 in the opposite direction to the direction of rotation imparted to the ratchet-wheel 6. Oscillations of the pulley 4 rotate the ratchet-wheels in opposite directions. Any convenient means may be employed to oscillate the pulley 4. In the drawings I have shown a slide 10, embracing the rod 1 and adapted to slide up and down thereon, having attached thereto one end of a cord or belt 11, which passes over the pulley 4 and has its other end attached to the end of the spring 12, conveniently consisting of a piece of elastic rubber. The pin 13 constitutes means for securing the fixed end of the spring 12 and a stop to limit the upward movement of the slide 10. Repeated reciprocations of the slide 10 impart oscillations to the pulley 4. The pulley 4, it will be noted, constitutes an oscillating pawl-carrier, so constructed and arranged as to impart opposite rotary movements to the two ratchets.

In the specific application of my movement to the chromatrope the ratchets carry the rotatable members 2, which constitute the disks of the chromatrope.

It will be observed that the rod 1 may be conveniently held by one hand while the other is used to reciprocate the slide 10 for rotating the disks.

Having thus described my invention, I claim as new and desire to secure by Letters Patent—

1. A mechanical movement, having, in combination, two oppositely-toothed ratchet-wheels, a pawl-carrier, a pawl carried thereby adapted to engage either the one or the other ratchet-wheel, and means for oscillating the pawl-carrier, substantially as described.

2. A mechanical movement, having, in combination, two rotatable elements, a device to engage and rotate said members and means for oscillating the device to rotate the members in opposite directions, substantially as described.

3. A mechanical movement, having, in combination, two rotatable elements located adjacent to each other and provided with ratchet-teeth on their adjacent sides, an oscillatory pawl-carrier located between the rotatable members, a pawl consisting of a pin slidingly mounted in the pawl-carrier, the opposite ends of the pin being adapted to engage the ratchet-teeth of one of the rotatable members when the pawl-carrier moves in one direction and vice versa, substantially as described.

4. A mechanical movement, having, in combination, a shaft, two oppositely-toothed ratchet-wheels loosely mounted thereon, an oscillating pawl-carrier loosely mounted on said shaft between the ratchet-wheels, and a sliding pawl carried by the carrier, adapted to be slid in one direction by the inclined teeth of one ratchet-wheel so as to engage and rotate the other ratchet-wheel when the pawl-carrier is moved in one direction, and vice versa, substantially as described.

5. A mechanical movement, having, in combination, a frame of a shape convenient for holding in the hand, an oscillating member, a reciprocable slide supported on the frame, connections between the slide and the oscillating member for actuating the latter from the former, two rotatable elements, and devices operated by the oscillating member for rotating the rotatable elements in opposite directions, substantially as described.

6. A mechanical movement, having, in combination, a rod to be held in the hand, rotatable elements supported by the rod, a slide mounted on the rod, connections between the slide and rotatable elements for rotating them in opposite directions, substantially as described.

7. A mechanical movement, having, in combination, a rod to be held in the hand, a pulley supported by the rod, a slide, a spring having one end secured to the rod, a belt connected to the slide and spring and passing over the pulley, a rotatable element mounted on the rod and connections between the pulley and rotatable element for rotating the latter from the former, substantially as described.

In testimony whereof I affix my signature in presence of two witnesses.

GAVIN HOLLIDAY.

Witnesses:
  HORACE VAN EVEREN,
  FRED O. FISH.